United States Patent
Goodwin et al.

(10) Patent No.: US 9,885,094 B2
(45) Date of Patent: Feb. 6, 2018

(54) SINGLE SHOT INDUCTOR FOR HEAT TREATMENT OF CLOSELY SPACED MULTIPLE ECCENTRIC CYLINDRICAL COMPONENTS ARRANGED ALONG THE LONGITUDINAL AXIS OF A WORKPIECE

(71) Applicant: Inductoheat, Inc., Madison Heights, MI (US)

(72) Inventors: John Aaron Goodwin, Berkley, MI (US); Valery I. Rudnev, Rochester Hills, MI (US)

(73) Assignee: Inductoheat, Inc., Madison Heights, MI (US)

( * ) Notice: Subject to any disclaimer, the term of this patent is extended or adjusted under 35 U.S.C. 154(b) by 236 days.

(21) Appl. No.: 14/607,596

(22) Filed: Jan. 28, 2015

(65) Prior Publication Data

US 2015/0225805 A1    Aug. 13, 2015

Related U.S. Application Data

(60) Provisional application No. 61/937,555, filed on Feb. 9, 2014.

(51) Int. Cl.

| | |
|---|---|
| *H05B 6/10* | (2006.01) |
| *C21D 9/30* | (2006.01) |
| *C21D 1/10* | (2006.01) |
| *F01L 1/047* | (2006.01) |
| *C21D 1/42* | (2006.01) |
| *H05B 6/36* | (2006.01) |
| *F01L 13/00* | (2006.01) |

(52) U.S. Cl.
CPC .............. *C21D 9/30* (2013.01); *C21D 1/42* (2013.01); *F01L 1/047* (2013.01); *H05B 6/101* (2013.01); *H05B 6/362* (2013.01); *H05B 6/365* (2013.01); *F01L 13/0036* (2013.01); *Y02P 10/253* (2015.11)

(58) Field of Classification Search
CPC ... C21D 9/30; C21D 1/42; F01L 1/047; F01L 13/0036; H05B 6/101; H05B 6/362; H05B 6/365; Y02P 10/253
USPC ....... 219/635, 639, 650, 632, 652, 656, 670, 219/676, 660; 266/127, 129, 125; 148/572, 575, 656, 559, 95, 320
See application file for complete search history.

(56) References Cited

U.S. PATENT DOCUMENTS

| | | | | |
|---|---|---|---|---|
| 4,604,510 A | * | 8/1986 | Laughlin ................. | C21D 9/30 148/575 |
| 6,765,181 B1 | | 7/2004 | Chatterjee et al. | |

FOREIGN PATENT DOCUMENTS

| | | |
|---|---|---|
| JP | 2001-214220 A | 8/2001 |
| JP | 2002-356719 A | 12/2002 |
| JP | 2005-082866 A | 3/2005 |
| JP | 2006-302635 A | 11/2006 |
| JP | 2009-293104 A | 12/2009 |
| JP | 2010-113937 A | 5/2010 |

(Continued)

*Primary Examiner* — Quang Van
(74) *Attorney, Agent, or Firm* — Philip O. Post

(57) ABSTRACT

A single shot inductor is provided to induction heat treat closely spaced multiple eccentric cylindrical components arranged along the longitudinal axis of a workpiece. The single shot inductor has multiple planar arcuate single turn coil sections separated from each other by an axial coil section so that each of the multiple planar arcuate single turn coil sections sequentially heat treats the closely spaced multiple eccentric cylindrical components inserted within the single shot inductor.

18 Claims, 14 Drawing Sheets

(56) References Cited

FOREIGN PATENT DOCUMENTS

| JP | 2011-014307 A | 1/2011 |
|----|---------------|--------|
| JP | 2011-047004 A | 3/2011 |

\* cited by examiner

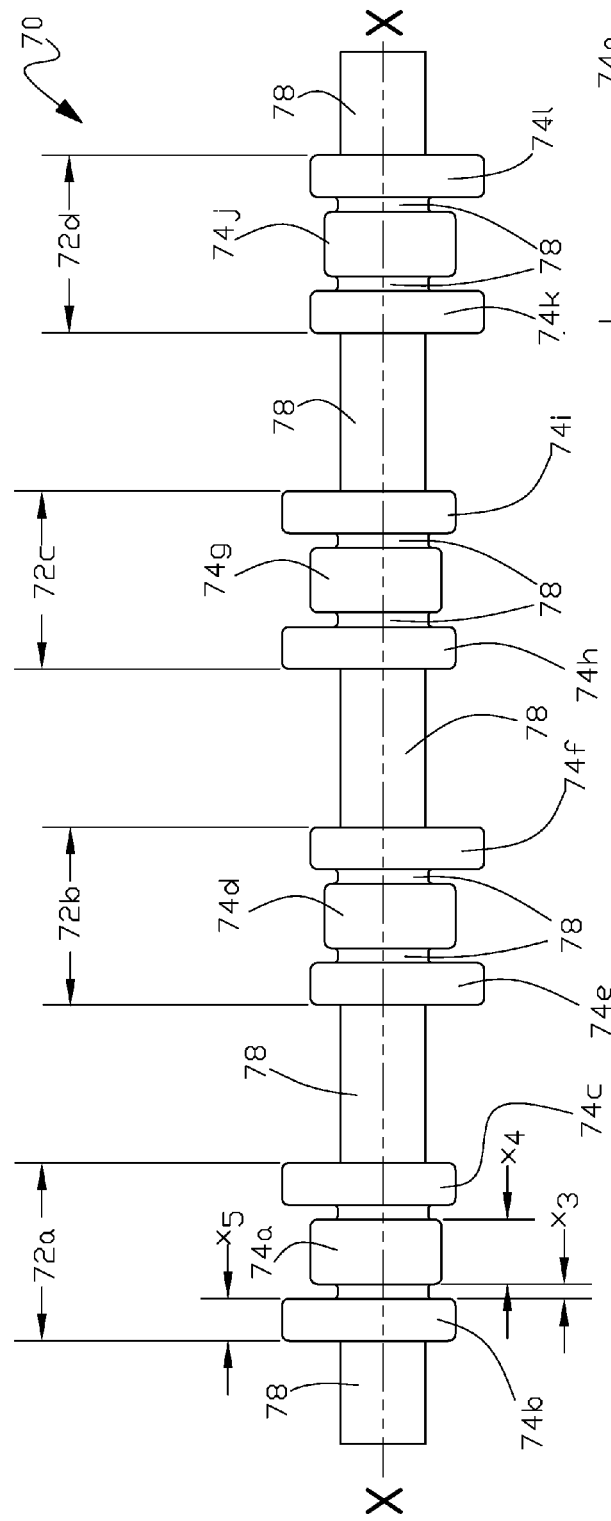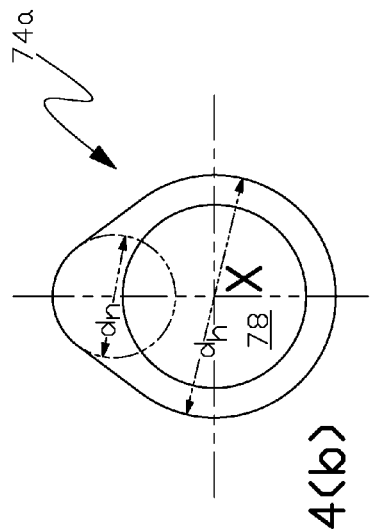
FIG. 4(a)
FIG. 4(b)
PRIOR ART

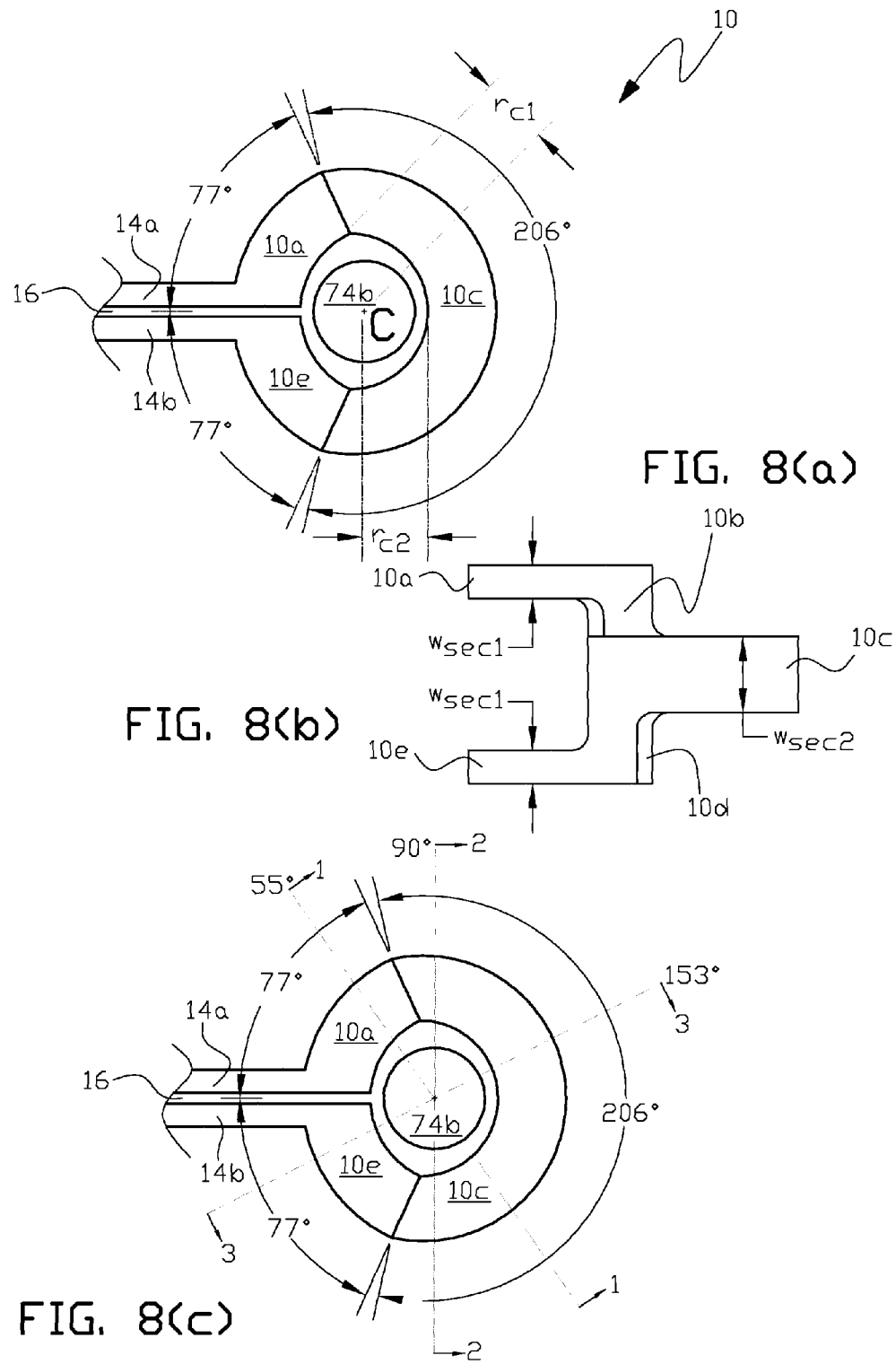

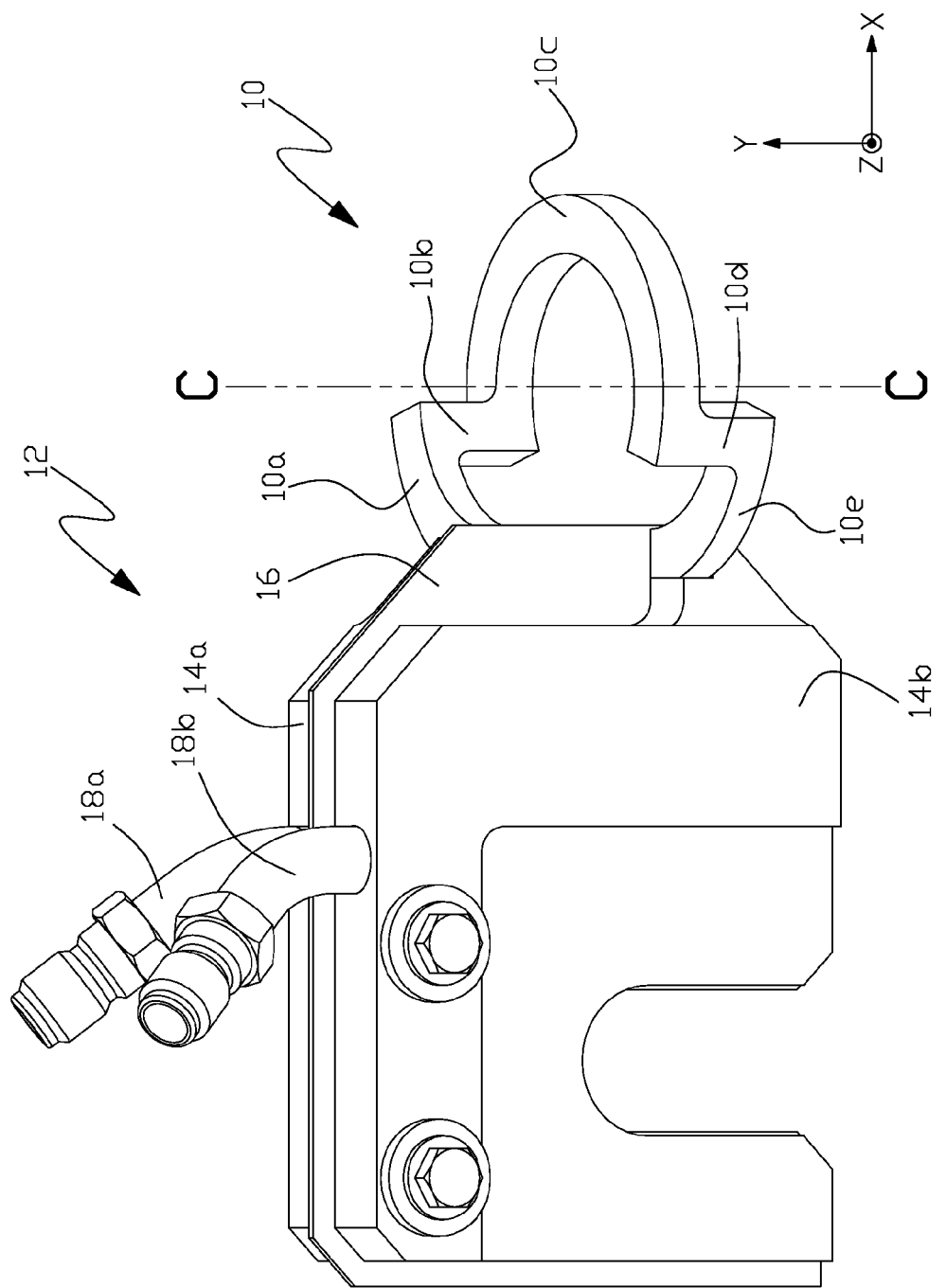

SINGLE SHOT INDUCTOR FOR HEAT TREATMENT OF CLOSELY SPACED MULTIPLE ECCENTRIC CYLINDRICAL COMPONENTS ARRANGED ALONG THE LONGITUDINAL AXIS OF A WORKPIECE

CROSS REFERENCE TO RELATED APPLICATIONS

This application claims the benefit of U.S. Provisional Application No. 61/937,555, filed Feb. 9, 2014, hereby incorporated by reference in its entirety.

FIELD OF THE INVENTION

The present invention relates to electric induction heat treatment of closely spaced multiple eccentric cylindrical components arranged along the longitudinal axis of a workpiece such as multiple closely spaced cam lobes on a camshaft used in internal combustion engines.

BACKGROUND OF THE INVENTION

A camshaft is used in an internal combustion engine to perform cyclical processes while the engine is in operation. For heat treatment purposes a camshaft can be geometrically described as a longitudinally oriented workpiece with at least one or more cam lobes, with each cam lobe in the shape of an eccentric cylindrical component, distributed along the central longitudinal axis of the camshaft. Generally, although not always, each cam lobe has an eccentric circular profile with the circular cam lobe center inline with the central longitudinal axis of the camshaft. In three dimensions the cam lobe may be described as an eccentric right cylindrical component aligned with the central longitudinal axis of the camshaft. There are typically multiple cam lobes distributed along the longitudinal axis of the camshaft to coordinate the opening and closing of the engine's intake and exhaust valves. Other components may form a camshaft in addition to the cam lobes. Entire camshafts may be produced by forging, casting, machining or assembly, and may be a solid, hollow or a combination solid and hollow camshaft.

Generally the spacing between adjacent cam lobes along the central longitudinal axis of a traditional camshaft is large since the components that a cam operates on (for example, an intake or exhaust valve) are spaced apart at large distances. For example a typical traditional camshaft 90 is shown in FIG. 1. The camshaft comprises four groupings (92a through 92d) of cam lobes (94a and 94b; 94c and 94d; 94e and 94f; and 94g and 94h) distributed along the axial length of cylindrical shaft 98. Additional camshaft features, such as bearings and end caps, are not shown. Typically the cam lobes are forged, cast or machined integral with the shaft and additional components, such as bearings, are added afterwards; alternatively camshaft components, for example, cam lobes, can be shrink fitted onto the camshaft. The number of cam lobes, their sizes, profiles, positioning and orientation are dependent upon the camshaft type and engine design. Camshafts, either hollow or solid, find use in many applications where one or more features on the camshaft, such as a cam lobe, must be metallurgically hardened to withstand wear and forces applied during a projected lifetime of use in an application. Typical axial widths $x_1$ of these cam lobes on traditional automotive camshafts are on the order of 9 to 21 mm (millimeters) and typical minimum axial separation $x_2$ between adjacent cam lobes is on the order of 12 to 40 mm.

When operating a valve, the cam lobe profile is the working surface of the cam lobe having contact with the rocker of a cam follower that is connected to the valve. During the camshaft's intended life cycle, a camshaft can rotate through millions of 360° rotational cycles and experience considerable wear and contact stresses due to sliding friction of the cam follower on the working surface of the cam lobe. The working surface for a cam lobe is illustrated with cross sectional hatching for cam lobe 94b in FIG. 1. A good combination of wear resistance and strength is essential for cam lobes, which require hardening of the working surface regions. Based on camshaft functionality, the working surface of a cam lobe comprises at least the following profile regions: the base circle (also known as the heel), the flank and the nose.

Lobe nose regions 95a and 95b, base circles 97a and 97b, and flanks 99a and 99b are shown in FIG. 2(a) and FIG. 2(b) for camshaft lobe profiles that are categorized as having either a "sharp" nose (in FIG. 2(a)) or a "regular nose" (in FIG. 2(b)) to distinguish a sharp nose region with a profile arc less than the profile arc of the typical regular nose in FIG. 2(b). The heel (base circle) is the portion of the cam lobe that is generally concentric with the shaft of the camshaft (for example, shaft 98 in FIG. 1), and has no lift of the element (such as the rocker of a cam follower) that makes contact with the working surface of the cam lobe; the flanks are the portions of the cam lobe with large acceleration and velocity to get the valve connected to the cam follower moving for opening or closing as quickly as possible; and the nose is the portion of the cam lobe with the smallest radius of curvature opposite the heel to give the greatest valve lift. Maximum cross sectional diameter of a cam lobe can be defined as the distance $y_1$ in FIG. 2(b) from the peak of the nose to the bottom of the heel.

Various types of heating inductors (also referred to as induction coils) can be utilized to induction harden components on a workpiece of generally cylindrical shape that includes a cam lobe with an eccentric right cylindrical shape as described herein. The inductors are generally single-turn or multi-turn inductors having a circular cross sectional shape, as shown, for single turn induction coil 80 in FIG. 3. Since the intensity of induction heating is dependent upon magnetic flux coupling with regions of the workpiece to induce the eddy current heating in the workpiece or component inserted in the coil, a uniform inductive heat treatment within a complex geometry area, such as a cam lobe, is difficult to achieve with conventional induction coil arrangements. The inductive heating process is further complicated by the fact that generally heat penetration into the interior of the workpiece is a combination of both inductive eddy current heating inwardly, and then further conductive inward heat transfer (sometimes called "heat soaking") from the eddy current regions (controlled by the depth of current penetration) towards the central region of the workpiece. Presence of workpiece regions adjacent to the workpiece region intended to be heat treated can complicate the ability of achieving required temperature uniformity in the intended heat treatment region.

Depending upon a camshaft's geometry and the required per unit heat treatment time production requirements, camshafts may be induction hardened using scan induction heating of each cam lobe with a single inductor; or static (single shot) heating of a single, or multiple lobes, with multi-turn inductors.

Scan induction hardening is typically used for lower production rates. Single turn scan inductors provide the greatest flexibility by allowing heat treating cam lobes of various widths with a minimum amount of power since only a fraction of a single cam lobe's working surface is heated in a given time period when using a scanning inductor with a narrow width face (80' in FIG. 3) that is less than the width of the cam lobe.

Scan induction hardening can be problematic when trying to meet a specified range of "minimum-to-maximum" hardness case (surface) depth variations when heating cam lobes with an appreciably different ratio of "lobe nose diameter-to-lobe base circle diameter," in particular when the cam lobes are positioned very close to each other. For example FIG. 4(*a*) and FIG. 4(*b*) illustrate one example of a non-traditional type of camshaft, namely a tri-lobe camshaft 70 with four tri-lobe groups (72*a*, 72*b*, 72*c* and 72*d*) each comprising three closely spaced cam lobs (lobes: 74*a*, 74*b* and 74*c*; 74*d*, 74*e* and 74*f*; 74*g*, 74*h* and 74*i*; and 74*j*, 74*k* and 74*l*) with each cam lobe having a lobe nose diameter $d_n$ to lobe base circle (heel) diameter $d_h$ ratio ($d_n$:$d_h$) within the range of greater than 1.5:1 or less than 1:1.5 and the axial distance $x_3$ between a central lobe (74*a*, 74*d*, 74*g* or 74*j*) and each associated outside end lobes (74*b* and 74*c*; 74*e* and 74*f*; 74*h* and 74*i*; and 74*k* and 74*l*) in each tri-lobe group being no greater than 2 to 5 mm with distances closer to 2 mm being more typical.

A tri-lobe camshaft can be used, for example, in an engine that has free floating reciprocating pistons each with a cam follower, where the pistons are arranged in one or more banks of four pistons, each of which extends over an angular interval of 90° banks, which may be separated by an angular interval of 30°. Cam lobe profiles in these engines will approach sinusoidal shape with different profiles according to the desired characteristics of a specifics engine. A hydraulically-actuated two-piece tappets switch between profiles on the tri-lobe camshaft alternates both the lift and the duration.

An attempt to scan induction harden the closely spaced cam lobes in a tri-lobe group is inevitably associated with at least a two-fold challenge: undesirable tempering back of adjacent lobes in a tri-lobe group that were already hardened; and the possibility of obtaining spotted hardness due to quench splashes onto surfaces of cam lobes already heated in a tri-lobe group from the surface of cam lobes being quenched due to the close axial proximity of the heated cam lobes and the cam lobes being quenched particularly in a tri-lobe group.

As an alternative to scan induction hardening, a group of closely spaced cam lobes in a tri-lobe group can be induction (one shot) hardened statically by inserting the closely spaced cam lobes in a tri-lobe group, such as tri-lobe group 72*a* (shown as a partial camshaft section in FIG. 5(*a*)) within single turn inductor 80 as shown in FIG. 5(*b*). Single-turn inductor 80 can be a hollow copper coil inductor with internal water cooling passage 81 thus forming a single turn inductor with coil width$_{coil}$, fixed cross sectional circular inner diameter $d_{in}$ and outer diameter $d_{out}$ as shown in FIG. 5(*b*). A tri-lobe group of cam lobes is typically connected to at least one other tri-lobe group of cam lobes along the axial length of the camshaft as shown in FIG. 4(*a*) via shaft 78. Referring to the tri-lobe group in FIG. 5(*a*), because of the electromagnetic proximity effect, the induced heat intensity of central lobe 74*a* will be much lower compared to the induced heat intensities (stippled regions) of outside end lobes 74*b* and 74*c* when heat treated with a single-turn inductor as shown in FIG. 5(*b*); this is due to the larger gap $g_1$ between an induction coil surface facing the central lobe (referred to as "face surface") and the working surface of the facing central lobe than the gaps $g_2$ between the induction coil face surface and the working surfaces of the outside end lobes within a tri-lobe group of cam lobes. Additionally in tri-lobe camshafts the outside end lobes in a tri-lobe group may be much thinner in width than the central lobe in a tri-lobe group; that is, the ratio of the width $x_4$ of the central lobe to the ratio of the width $x_5$ of each outside end lobe in a tri-lobe group can be greater than 2:1 as illustrated in FIG. 4(*a*). These factors result in appreciably deeper hardened case (surface) depth of the outside end lobes (74*b* and 74*c*) compared to the central lobe 74*a* as illustrated by the stippled working surface regions in outside end lobes 74*b* and 74*c* in FIG. 5(*b*) and practically no (stippled) working surface depth hardening of central lobe 74*a*. Depending upon the geometrical differences of the outside end lobes versus the central lobe in a tri-lobe group, the difference in the hardness case (surface) depth can be unacceptable. For example, in order to obtain specified minimum hardened case (surface) depth on the central lobe in a tri-lobe group, the outside end lobes in the tri-lobe group can be overheated to the extent of producing undesirable microstructures and metallurgically unacceptable results (such as, grain boundary liquation, grain coarsening, steel burning and cracking).

The use of a multi-turn inductor with each of the multiple turns having a fixed cross sectional circular inner diameter and outer diameter can also be used to heat treat cam lobes in a tri-lobe group. FIG. 6(*a*) illustrates in cross section cam lobes 74*a*, 74*b* and 74*c* in tri-lobe group 72*a* and three turn inductor 82 comprising middle coil turn 82*b* and outside end turns 82*a* and 82*c*, with the outside end coil turns axially off set (centered at axial locations $X_{axis1}$ and $X_{axis2}$) from outside end lobes 74*b* and 74*c* (centered at $X_{axis3}$ and $X_{axis4}$) to magnetically decouple the outside end coil turns from the magnetic field established when the three turn inductor is suitably connected to a power supply, and the inside cross sectional radius $r_1$ of the middle coil turn 82*b* is less than the inside radius $r_2$ of the outside end coil turns 82*a* and 82*c*. The three turn inductor arrangement in FIG. 6(*a*) results in an improved hardened surface (case) depth distribution (illustrated by stippled regions) for the central lobe 74*a* and outside end lobes 74*b* and 74*c* over that for the single turn inductor arrangement shown in FIG. 5(*b*) where there is no appreciable working surface hardening of central lobe 74*a*. Further improvement can be made to the three turn inductor arrangement in FIG. 6(*a*) by adding flux concentrator 62 over and around the sides of middle coil turn 82*b* to increase the localized magnetic flux field and the induced heat intensity in central lobe 74*a* as shown in FIG. 6(*b*) where the overall axial length and depth of the thumbnail shaped (stippled) case hardened region in the central lobe is increased over that in the FIG. 6(*a*) arrangement. Further improvement to the three turn inductor arrangements in FIG. 6(*a*) and FIG. 6(*b*) can be made with the four turn inductor 84 arrangement shown in FIG. 7. The four turn inductor 84 comprises two outside end coil turns 84*a* and 84*d*, and two middle coil turns 84*b* and 84*c* with all turns suitably connected to a power source. As shown by the stippled (case hardened) regions in FIG. 7 the two middle turns of coil 84 that are positioned over central lobe 74*a* intensify induced heating of the wide central lobe resulting in an improved hardness pattern of the central lobe and a noticeable reduction of the central lobe's undesirable thumbnail shape over that for the arrangements in FIG. 6(*a*) and FIG. 6(*b*).

It is one object of the present invention to provide a single turn inductor with improved single shot heat treatment of closely spaced multiple eccentric cylindrical components distributed along the longitudinal axis of a workpiece.

It is another object of the present invention to provide a method of single turn inductor heat treatment of closely spaced multiple eccentric cylindrical components distributed along the longitudinal axis of a workpiece.

It is another object of the present invention to provide a single turn inductor with improved single shot heat treatment of closely spaced multiple cam lobes distributed along the axial length of a camshaft.

It is another object of the present invention to provide a method of single turn inductor heat treatment of closely spaced multiple cam lobes distributed along the axial length of a camshaft.

It is another object of the present invention to provide a single turn inductor with improved single shot heat treatment of closely spaced multiple cam lobes in a tri-lobe group distributed along the axial length of a tri-lobe camshaft.

It is another object of the present invention to provide a method of single turn inductor heat treatment of closely spaced multiple cam lobes in a tri-lobe group distributed along the axial length of a tri-lobe camshaft.

BRIEF SUMMARY OF THE INVENTION

In one aspect the present invention is a single shot inductor for induction heat treatment of closely spaced multiple eccentric cylindrical components arranged along the longitudinal axis of a workpiece. The single shot inductor has multiple planar arcuate single turn coil sections separated from each other by an axial coil section so that each of the multiple planar arcuate single turn coil sections sequentially heat treats the closely spaced multiple eccentric cylindrical components that are rotated about the central axis of the single shot inductor during the heat treatment process when inserted within the single shot inductor.

In another aspect the present invention is a method of heat treating closely spaced multiple eccentric cylindrical components arranged along the longitudinal axis of a workpiece with a single shot inductor having multiple planar arcuate single turn coil sections separated from each other by an axial coil section so that each of the multiple planar arcuate single turn coil sections sequentially heat treats the closely spaced multiple eccentric cylindrical components that are rotated about the central axis of the single shot inductor during the heat treatment process when inserted within the single shot inductor.

In one aspect the present invention is a single shot inductor for induction heat treatment of closely spaced multiple cam lobes arranged along the longitudinal axis of a camshaft. The single shot inductor has multiple planar arcuate single turn coil sections separated from each other by an axial coil section so that each of the multiple planar arcuate single turn coil sections sequentially heat treats the closely spaced multiple cam lobes that are rotated about the central axis of the single shot inductor during the heat treatment process when inserted within the single shot inductor.

In another aspect the present invention is a method of heat treating closely spaced multiple cam lobes arranged along the longitudinal axis of a camshaft with a single shot inductor having multiple planar arcuate single turn coil sections separated from each other by an axial coil section so that each of the multiple planar arcuate single turn coil sections sequentially heat treats the closely spaced multiple cam lobes that are rotated about the central axis of the single shot inductor during the heat treatment process when inserted within the single shot inductor.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth herein.

FIG. 4(a) illustrates one example of a tri-lobe camshaft.

FIG. 4(b) illustrates one example of a cam lobe profile used with a tri-lobe camshaft.

FIG. 8(a) and FIG. 8(b) are top and side elevational views of one example of a single shot inductor of the present invention for heat treatment of closely spaced multiple eccentric cylindrical components arranged along the longitudinal axis of a workpiece.

FIG. 8(c) is the top elevational view of the single shot inductor shown in FIG. 8(a) indicating side cross sectional elevation views through line 1-1 at 55°, line 2-2 at 90°; and line 3-3 at 153°.

FIG. 9, FIG. 10 and FIG. 11 are various views of the single shot inductor of the present invention shown in FIG. 8(a) and FIG. 8(b) installed in an inductor assembly.

DETAILED DESCRIPTION OF THE INVENTION

FIG. 8(a) and FIG. 8(b) illustrate one example of a single shot inductor 10 for heat treatment of closely spaced multiple eccentric cylindrical components arranged along the longitudinal axis of a workpiece. The term "closely spaced" as used herein means that the distance between adjacent eccentric cylindrical components in a group of closely spaced multiple eccentric cylindrical components is no greater than 2 to 5 mm as disclosed herein, for example, for a tri-lobe group where the workpiece is a tri-lobe camshaft.

In this example single shot inductor 10 is a single turn induction coil comprising five sequential single turn coil segments formed sequentially from first planar arcuate single turn coil section 10*a*; first axial coil section 10*b*; second planar arcuate single turn coil section 10*c*; second axial coil section 10*d*; and third planar arcuate single turn coil section 10*e*.

In this example all five sequential single turn coil sections have a common coil sections longitudinal central axis C (FIG. 9) with the first and second axial coil sections oriented parallel to the common coil sections longitudinal central axis C and the first, second and third planar arcuate single turn coil sections planarly oriented in planar cross section perpendicular to the common coil sections longitudinal central axis C and planarly spaced apart from each other by the first and second axial coil sections. For example in FIG. 9 planar cross sections of the first, second and third planar arcuate single turn coil sections would lay in an X-Z plane and the first and second axial coil sections would be oriented with the X-axis parallel to the common coil sections longitudinal central axis C where X, Y and Z define a three dimensional Cartesian orthogonal coordinate system.

In this example the inside radius of curvature $r_{c1}$ of outside (first and third) end planar arcuate single turn coil sections 10*a* and 10*e* is greater than the inside radius of curvature $r_{c2}$ of central (second) planar arcuate single turn coil section 10*c* with respect to the common coil sections longitudinal central axis C.

Figure 10:
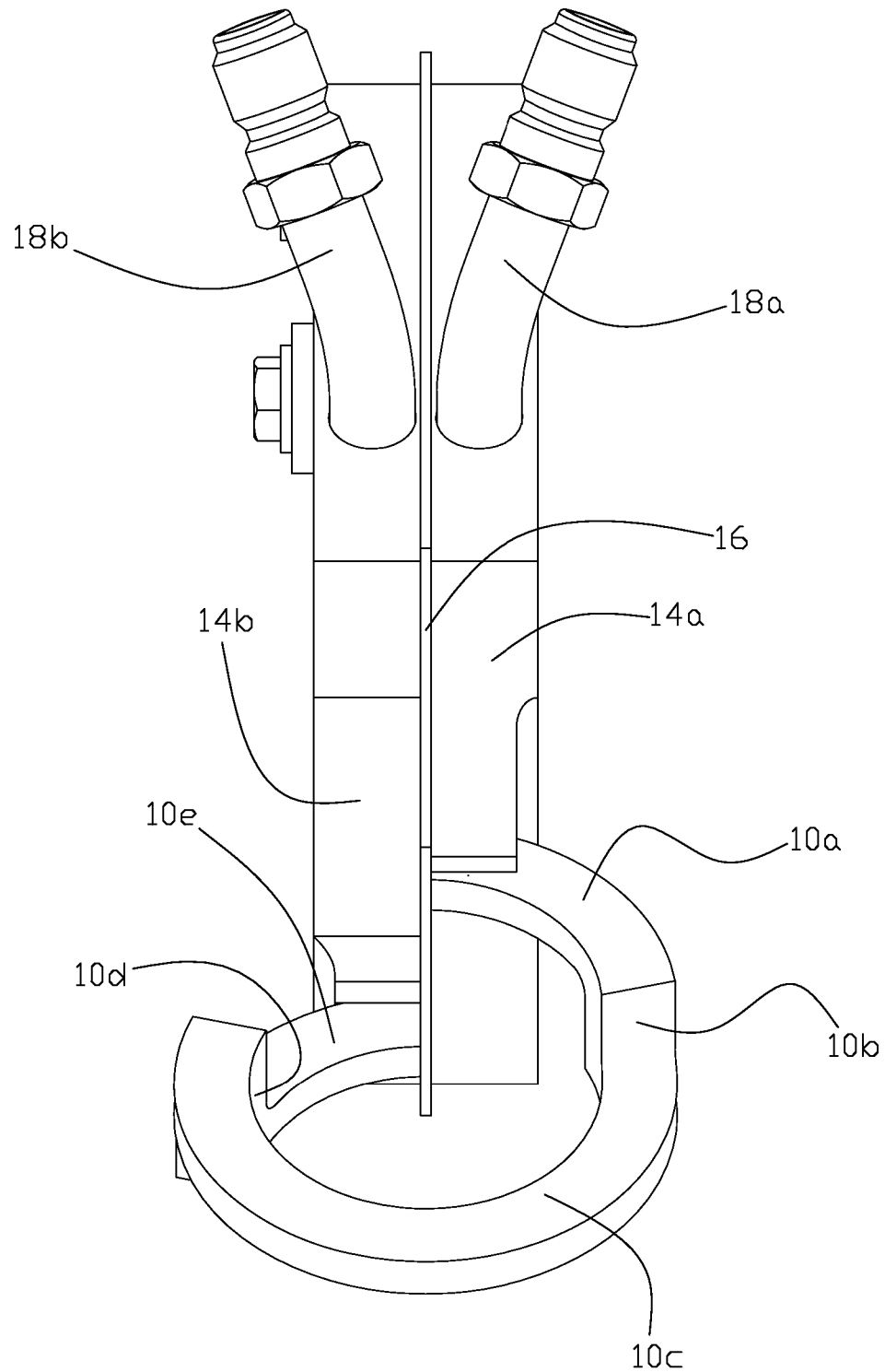
Figure 11:
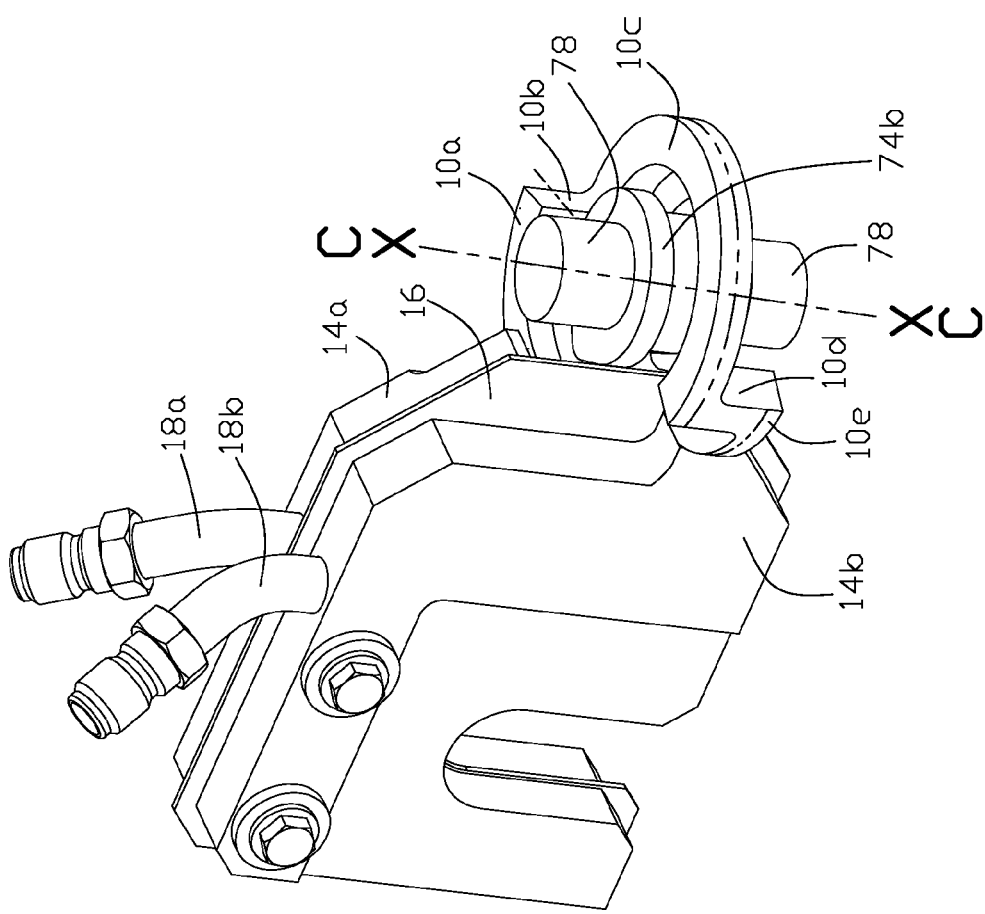

Single shot inductor 10 can be installed in a suitable inductor assembly 12 as shown for example in FIGS. 9, 10 and 11. Single shot inductor 10 outside end sections, namely first and third planar arcuate single turn coil sections 10*a* and 10*e* can terminate respectively in power terminals 14*a* and 14*b* in the inductor assembly with electrical insulation 16 separating the two power terminals that can be connected to a suitable alternating current power source not shown in the figures. For example first power terminal 14*a* can be connected to a first alternating current source output and second power terminal 14*b* can be connected to a second alternating current source output so that the first and second alternating current source outputs can supply alternating current from the power source to establish a magnetic field around the single shot inductor for flux coupling and induction heating of the group of closely spaced multiple eccentric cylindrical components inserted in the single shot inductor.

The widths of the heating facing surfaces of the planar arcuate single turn coil sections (that is, the side of a coil section facing the workpiece) can vary for each planar arcuate single turn coil section to accommodate width variations of the eccentric cylindrical components (for example, cam lobes) being heat treated. For example, as illustrated in FIG. 8(*b*), width $w_{sec1}$ of the heating facing surfaces of planar arcuate single turn coil sections 10*a* and 10*e* can be less than the width $w_{sec2}$ of the heating facing surface of planar arcuate single turn coil section 10*c*.

If single shot inductor 10 is internally cooled by a fluid medium, inductor assembly conduits 18*a* and 18*b* can be provided and connected to the supply and return of a fluid cooling medium for flow of the cooling medium through an internal passage way within the single shot inductor. For example a cooling fluid medium supply port in the inductor assembly can be provided for supply of the fluid cooling medium to an interior supply passage within the inductor assembly, and a cooling fluid medium return port in the inductor assembly can be provided for return of a cooling fluid medium from an interior return passage within the inductor assembly. A continuous internal single shot inductor cooling passage can be provided within the interior of the first planar arcuate single turn coil section, the first axial coil section, the second planar arcuate single turn coil section, the second axial coil section, and the third planar arcuate single turn coil section of the single shot inductor, with the interior supply passage in the inductor assembly connected to an internal inductor entry port in the continuous internal single shot inductor cooling passage in the first planar arcuate single turn coil section and an internal inductor exit port in the continuous internal single shot inductor cooling passage in the third planar arcuate single turn coil section so that the cooling fluid medium flows from the supply of the cooling fluid medium to the return of the cooling fluid medium.

For heat treatment of closely spaced multiple eccentric cylindrical components arranged along the longitudinal axis of a workpiece with the embodiment of single shot inductor 10 shown in the drawings the closely spaced multiple eccentric cylindrical components are inserted into the single shot inductor as shown in FIG. 11 for the cam lobes of tri-lobe group 72*a* on shaft 78.

Figure 12A:
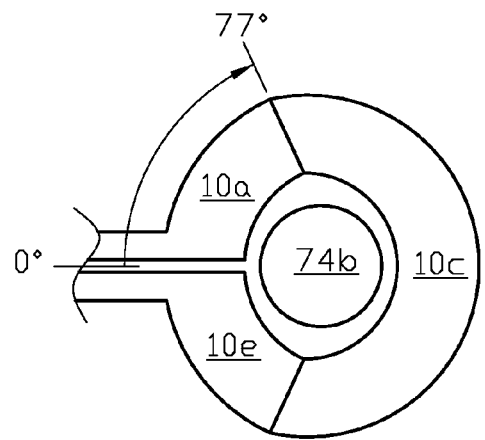
FIG. 12(a) through FIG. 12(c) illustrate the sequential inductive heating with first, second and third planar arcuate single turn coil sections of the single shot inductor shown in FIG. 8(a) as a workpiece component rotates within the single shot inductor.
Figure 12B:
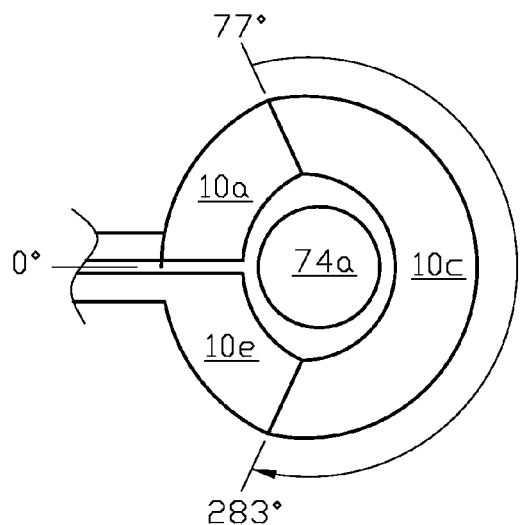
Figure 12C:
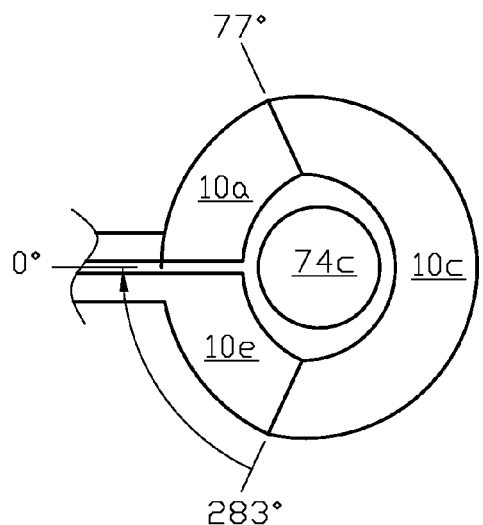

The camshaft and the tri-lobe group (that is a part of the camshaft) within the single shot inductor are rotated within static single shot inductor 10 to inductively heat each lobe in the tri-lobe group by electromagnetic coupling with alternating current flowing through the single shot inductor for a time period required to achieve desired circumferential heating of the cam lobes in the tri-lobe group. In this example of the invention the central workpiece axis X of the tri-lobe group (camshaft) of cam lobes is coincident with the common coil sections longitudinal central axis C when inserted into the single shot inductor. Each of the three planar arcuate single turn coil sections 10*a*, 10*c* and 10*e* sequentially inductively heat a section of the tri-lobe group of cam lobes as the tri-lobe group (camshaft) makes a 360° rotation within the single shot inductor. For example with reference to the angular notation in FIG. 12(*a*) through FIG. 12(*c*), and with reference to an axial working surface region of a cam lobe in the tri-lobe group starting at 0°, and the tri-lobe group (camshaft) rotating in the clockwise direction, first (upper end) planar arcuate single turn coil section 10*a* inductively heats the tri-lobe group for 77° of rotation; for the next 206° of rotation second (middle) planar arcuate single turn coil section 10*c* inductively heats the tri-lobe group; and for the final 77° of full 360° rotation third (lower end) planar arcuate single turn coil section 10*e* inductively heats the tri-lobe group 72*a*. The first and second axial coil sections 10*b* and 10*d* do not significantly contribute to the inductive heating and primarily provide an axial offset distance between the first, second and third planar arcuate single turn coil sections while the sequential induced heating of planar arcuate single turn coil sections 10*a*, 10*c* and 10*e* is performed.

Figure 13A:
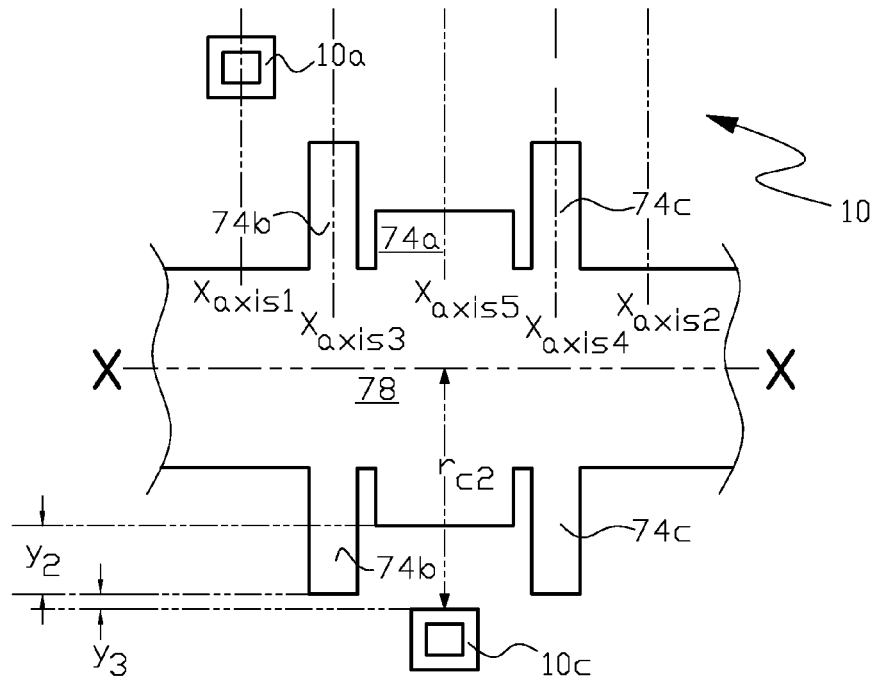
FIG. 13(a) through FIG. 13(c) illustrate in cross sectional views the sequential inductive heating with first, second and third planar arcuate single turn coil sections of the single shot inductor shown in FIG. 8(c) as a workpiece component rotates within the single shot inductor.
Figure 13B:
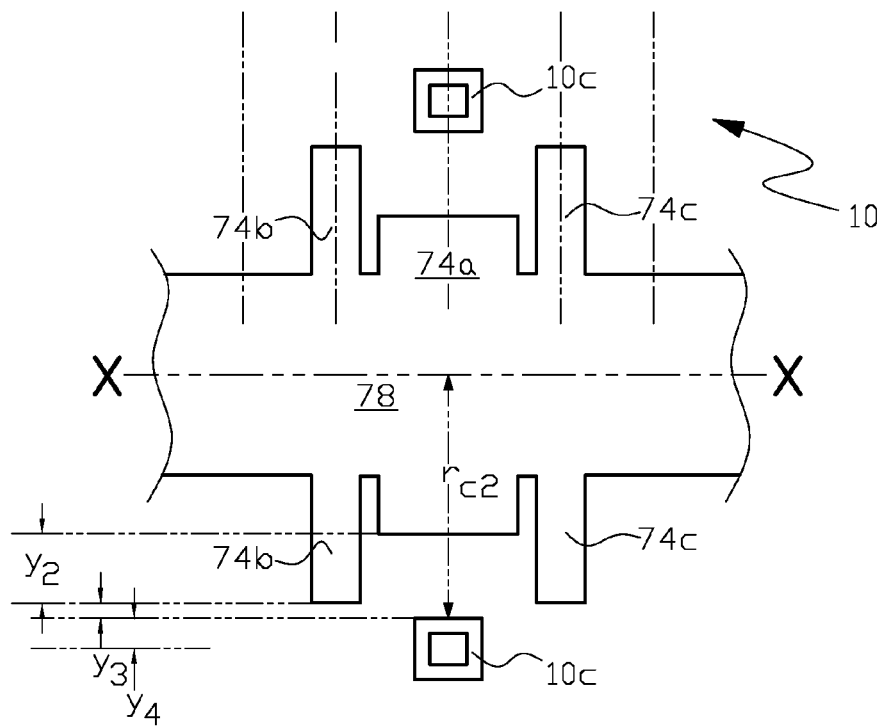
Figure 13C:
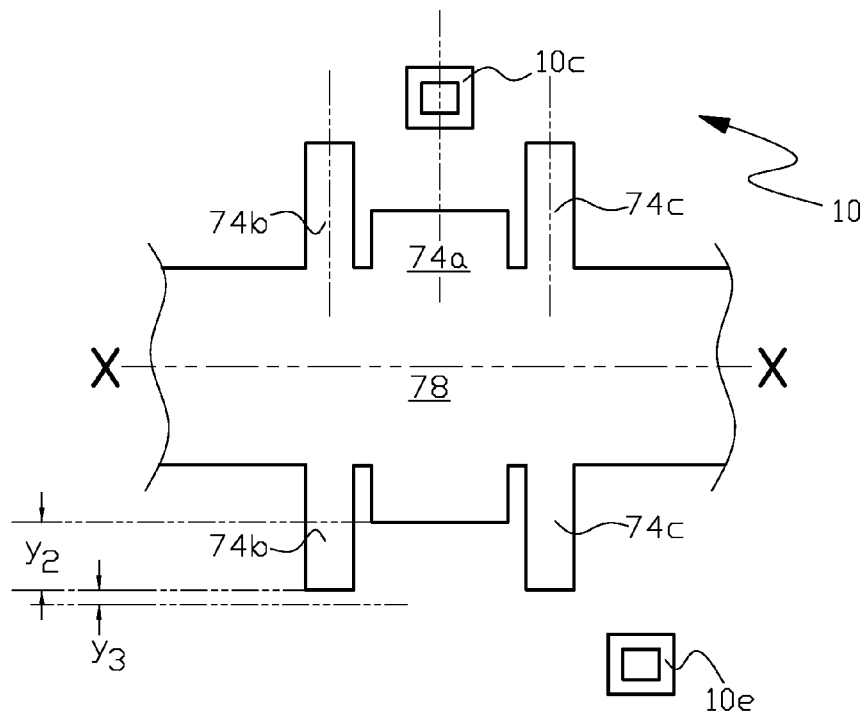

FIG. 13(*a*) through FIG. 13(*c*) illustrate in cross sectional view (with reference to FIG. 8(*c*)) the active inductively heating planar arcuate single turn coil sections as the inserted workpiece rotates through 360°. FIG. 13(*a*) illustrates in cross sectional view active inductively heating planar arcuate single turn coil sections 10*a* and 10*c* at 55° rotation; FIG. 13(*b*) illustrates in cross section active inductively heating planar arcuate single turn coil section 10*c* at 90° rotation; and FIG. 13(c) illustrates in cross section active inductively heating planar arcuate single turn coil sections 10c and 10e at 153° rotation. In this embodiment the first and third planar arcuate single turn coil section are respectively axially offset from the outside end cam lobes 74a and 74c as shown in the figures.

The relative axial positioning of the planar arcuate single turn coil section to each lobe in the tri-lobe group and the arcuate length of each planar arcuate single turn coil section control the induced heating intensity in each cam lobe. For example in this embodiment the inside cross sectional radius $r_{c2}$ of the second planar arcuate single turn coil section 10c is less than the inside cross sectional radius $r_{c1}$ of the first and third outside end planar arcuate single turn coil sections 10a and 10c to provide for greater electromagnetic coupling between the second planar arcuate single turn coil section and wider central lobe 74a.

Further if the inner cross sectional radius of a planar arcuate single turn coil section is planarly coincident with a cam lobe then the inner radius of curvature of the planar arcuate section has to be greater than the maximum cross sectional radius of the cam lobe.

Figure 14A:
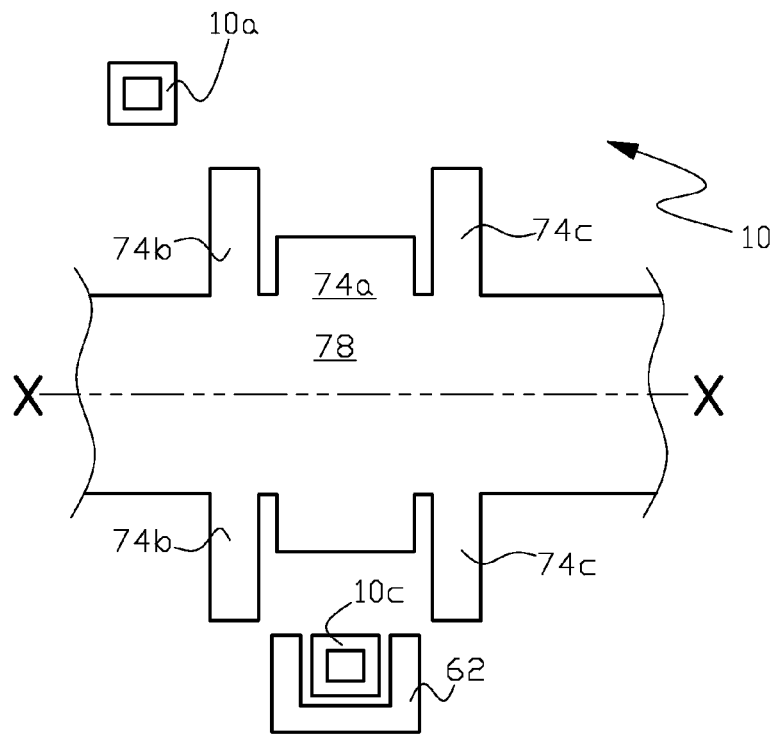
FIG. 14(a) through FIG. 14(c) illustrate in cross sectional views the sequential inductive heating with first, second and third planar arcuate single turn coil sections of the single shot inductor shown in FIG. 8(c) as a workpiece component rotates within the single shot inductor with application of a magnetic flux compensator.
Figure 14B:
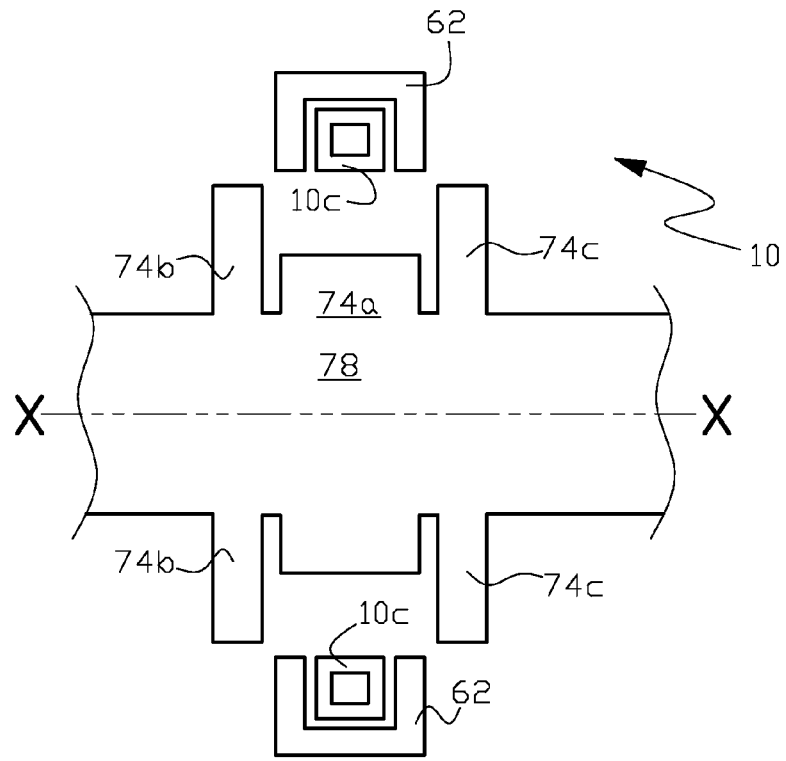
Figure 14C:
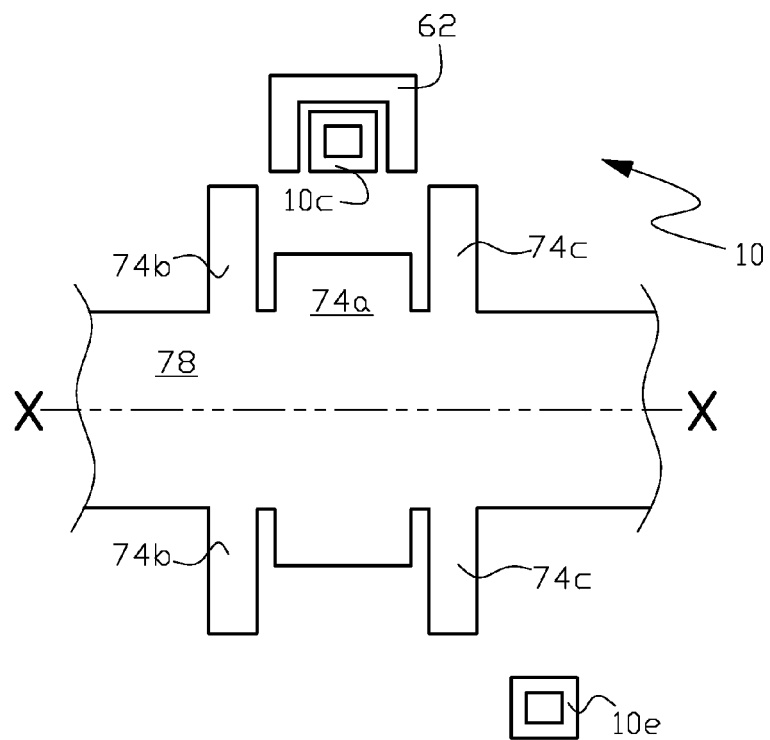

FIG. 14(a) through FIG. 14(c) illustrate in cross sectional view the active inductively heating planar arcuate single turn coil sections as the inserted workpiece rotates through 360° with the addition of "U" shaped magnetic flux concentrator 62 as shown in the figures around three sides of the second planar arcuate single turn coil section 10c to increase the second planar arcuate single turn coil section's induced heat intensity and prevent overheating of adjacent outside end cam lobes 74b and 74c. FIG. 14(a) illustrates in cross section active inductively heating planar arcuate single turn coil sections 10a and 10c at 55° rotation; FIG. 14(b) illustrates in cross section active inductively heating planar arcuate single turn coil section 10c at 90° rotation; and FIG. 14(c) illustrates in cross section active inductively heating planar arcuate single turn coil sections 10c and 10e at 153° rotation. A flux concentrator of "U" shape, or other shape as required to direct flux, can be utilized in one or more of the planar arcuate single turn coil sections as may be required for a particular arrangement of closely spaced multiple eccentric cylindrical components being heat treated.

Figure 1:
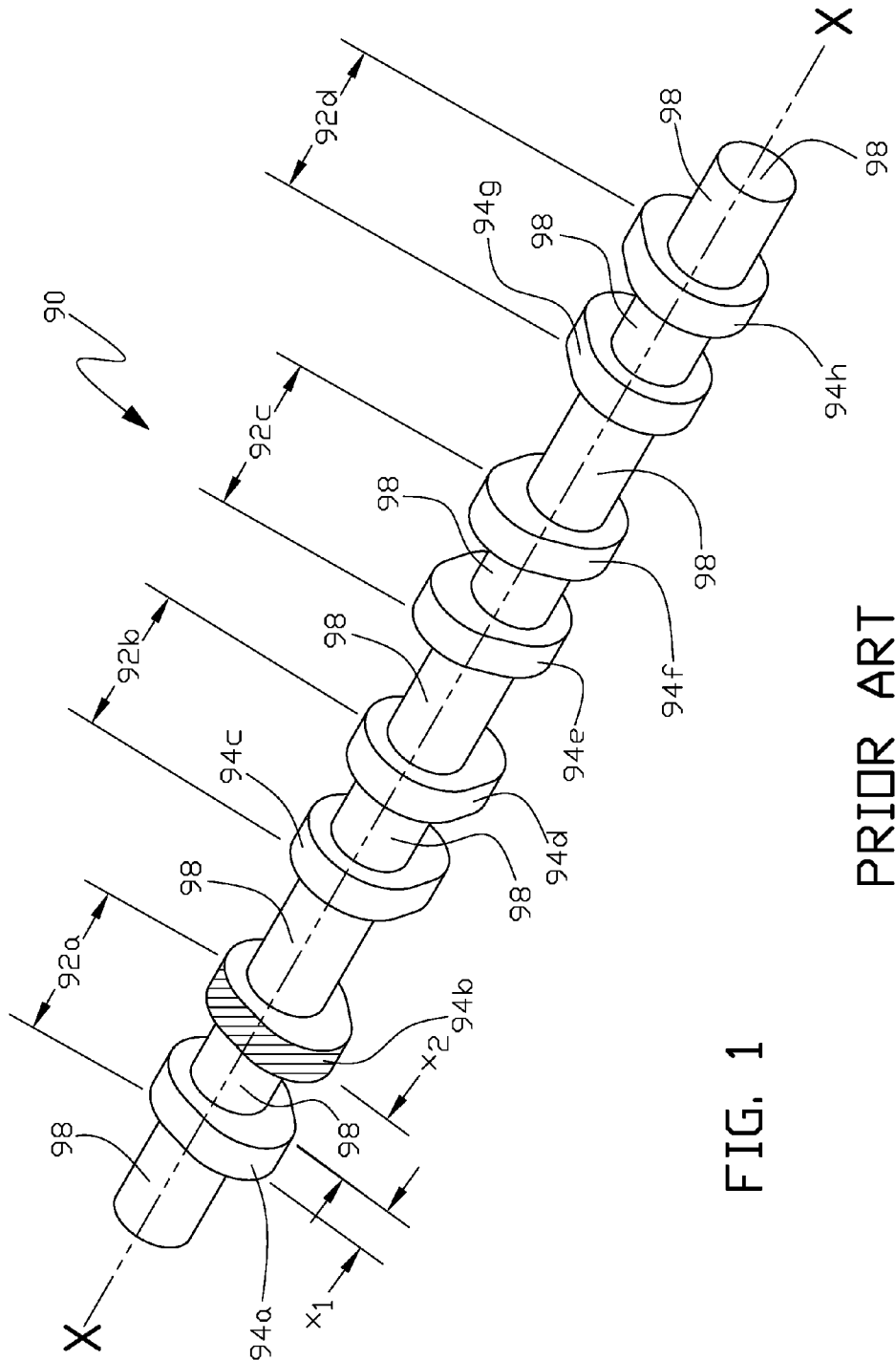
FIG. 1 is an isometric view of one example of a traditional camshaft that can be used in an internal combustion engine.
Figure 2A:
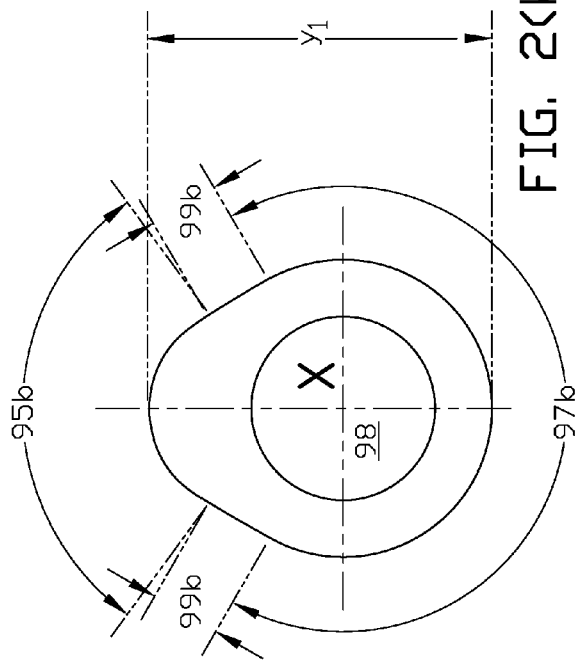
FIG. 2(a) and FIG. 2(b) are examples of two types of cam lobe profiles.
Figure 2B:
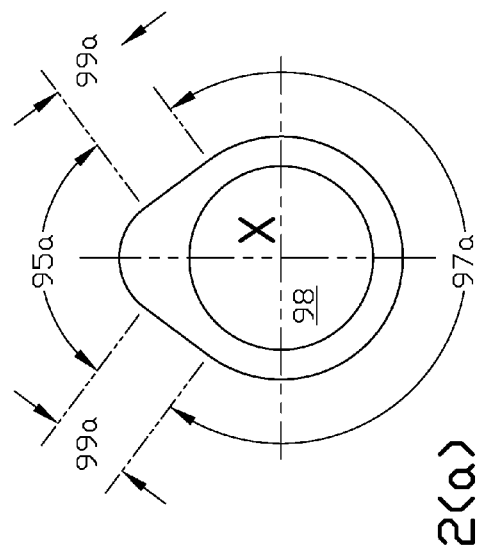
Figure 3:
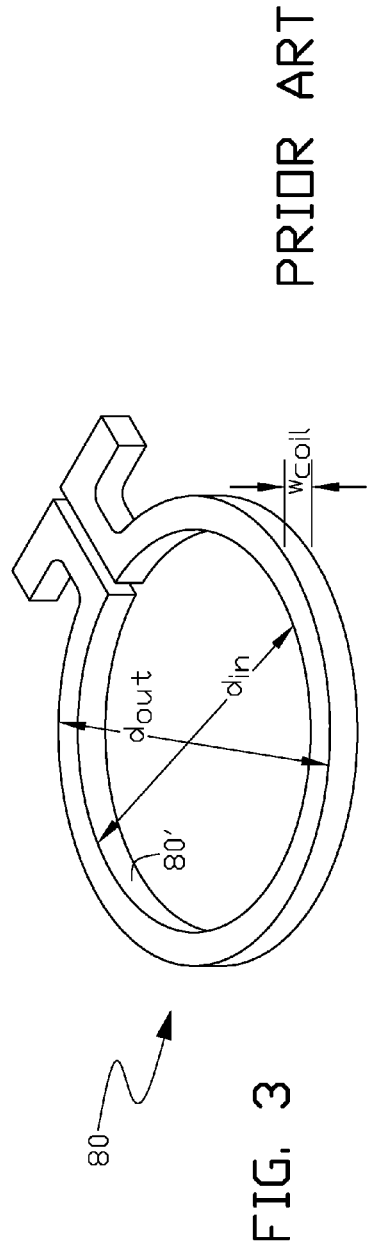
FIG. 3 illustrates a typical single turn inductor.
Figure 5A:
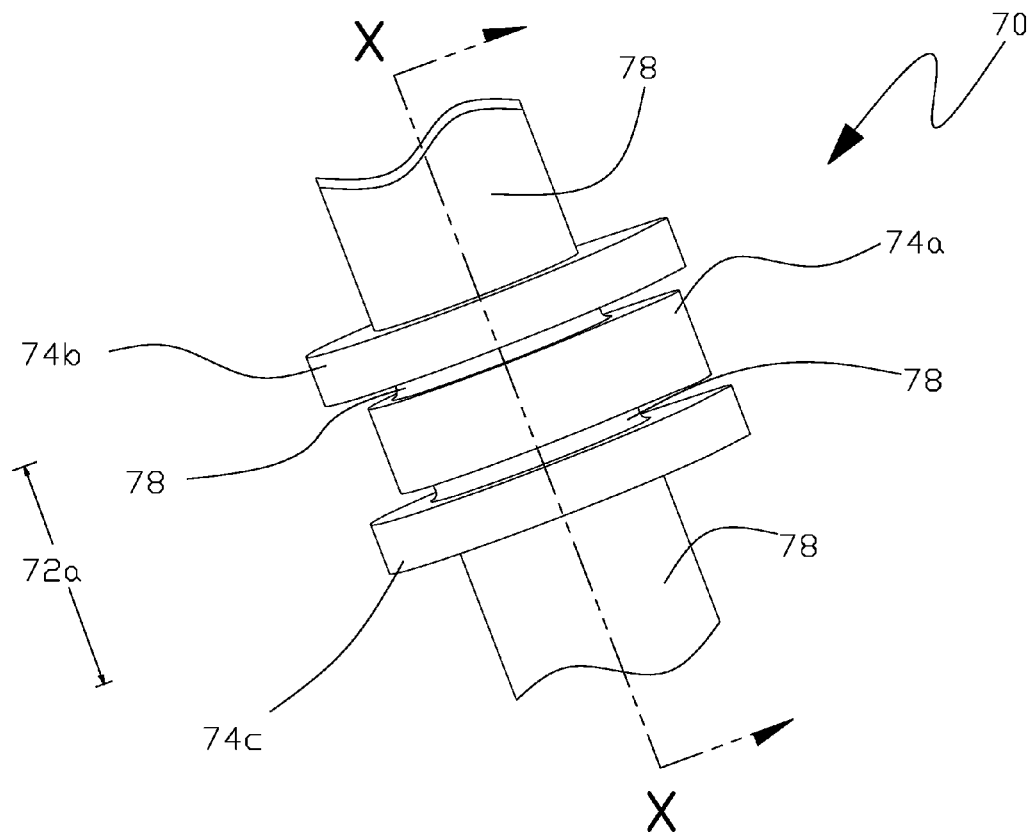
FIG. 5(a) illustrates cam lobes in one tri-lobe group on the camshaft shown in FIG. 4(a).
Figure 7:
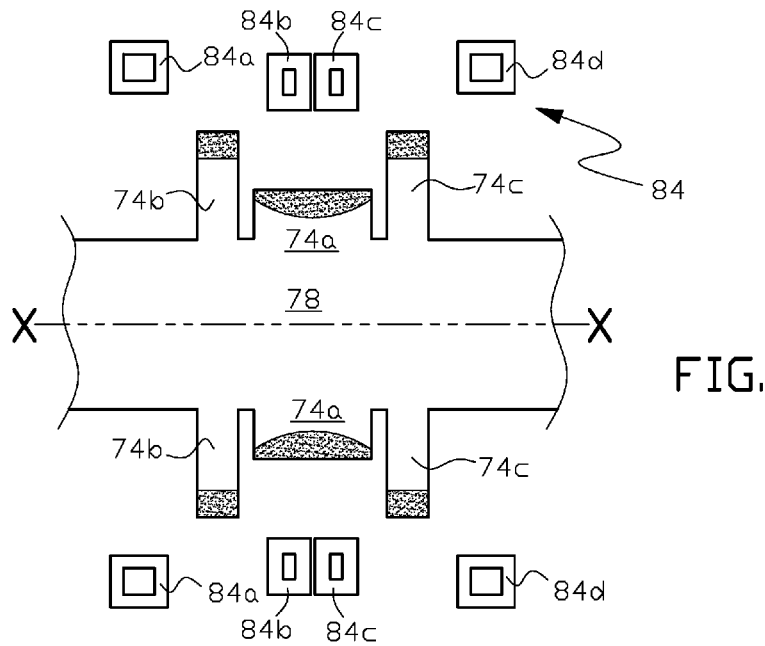
FIG. 7 illustrates one method of induction heat treating the tri-lobe group shown in FIG. 5(a) with a four turn inductor.
Figure 5B:
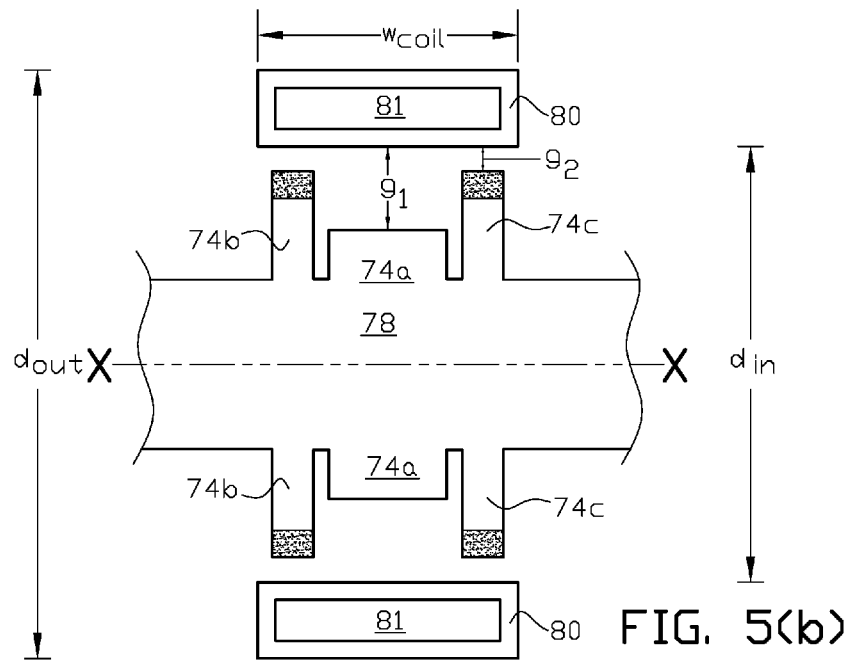
FIG. 5(b) illustrates one method of induction heat treating the cam lobes in the tri-lobe group shown in FIG. 5(a) with a single turn inductor.
Figure 6A:
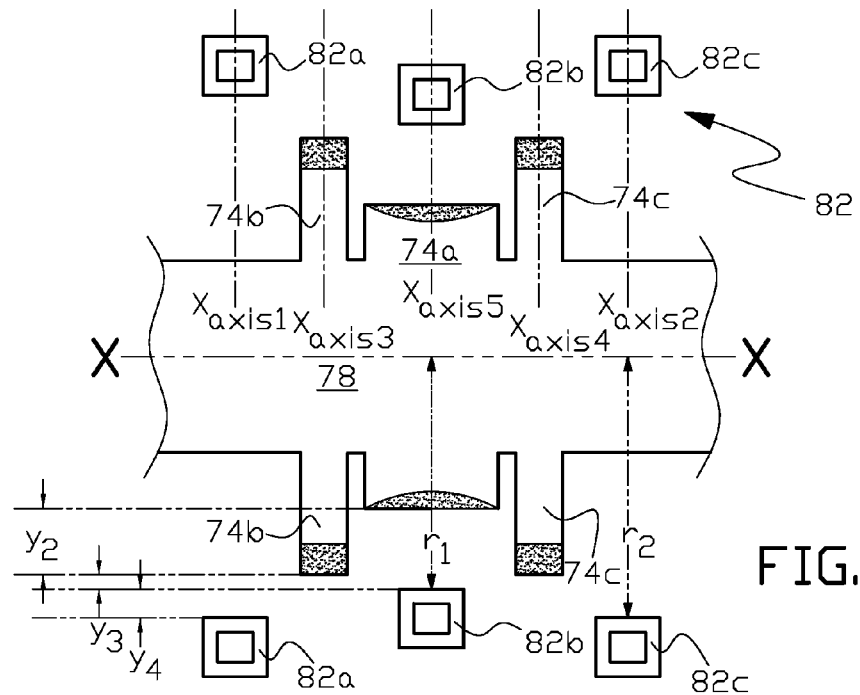
FIG. 6(a) illustrates one method of induction heat treating the cam lobes in the tri-lobe group shown in FIG. 5(a) with a three turn inductor.
Figure 6B:
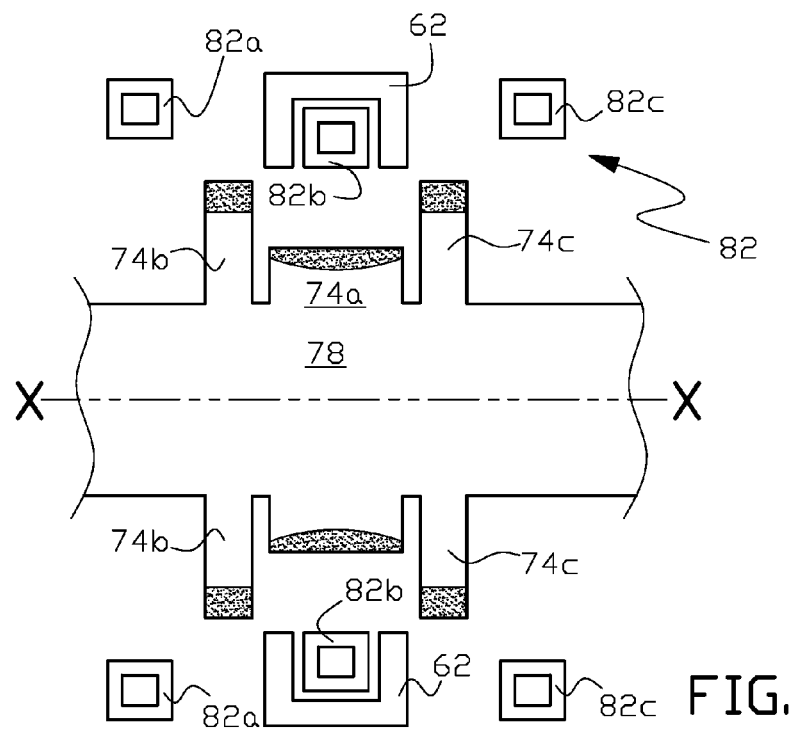
FIG. 6(b) illustrates another method of induction heat treating the cam lobes in the tri-lobe group shown in FIG. 5(a) with a three turn inductor.

The cross sectional views in FIG. 13(a) through FIG. 14(c) are diagrammatic in that they show in cross section all three cam lobes in a tri-lobe group as cylindrical components whereas each cam lobe is an eccentric right cylindrical component. The cam lobe nose region, which gives the cam lobe its eccentric (non-cylindrical) shape as shown for example in FIG. 2(a) and FIG. 2(b) for typical cam lobes, can be located at different axial angles (that is, angles in a plane perpendicular to axis X-X) depending upon the required timing displacement angle for the component (for example, a valve) that the nose of a particular cam lobe acts upon. This nose eccentricity can be present in one or more of the cross sectional diagrammatic cylindrical views in FIG. 13(a) through FIG. 14(c).

In other examples of the invention the arcuate length of each planar arcuate single turn coil section can be different from each other depending upon the configuration of the closely spaced multiple eccentric cylindrical components being inductively heated within the single shot inductor. For example to further compensate the heating deficit of electromagnetically decoupled cam lobes and control the induced heat intensity among differently shaped cam lobes, the planar arcuate single turn coil sections that correspond to cam lobes with noticeably reduced heat intensities can be of longer arc lengths compared to better-coupled low-mass and/or thinner width cam lobes.

In other examples of the invention more than three planar arcuate single turn coil sections may be used with axial separation provided by three or more axial coil sections to form a single turn single shot inductor of the present invention.

In other examples of the invention in addition to rotation of the workpiece (component) being heat treated, the single shot inductor of the present invention may move along the common coil sections longitudinal central axis C during the heat treatment process.

Multiple tri-lobe groups on a camshaft can be heat treated either sequentially through one single shot inductor 10 or multiple spaced apart single shot inductors 10 can be used to simultaneously heat all or some of the multiple tri-lobe groups on a camshaft.

Quench supply and distribution apparatus may optionally be provided with single shot inductor 10 to quench the tri-lobe group after heat treatment.

The above single shot inductor heating of closely spaced multiple eccentric cylindrical components can be accomplished without static workpiece pre-heat process steps. In other examples of the invention prior to rotation of the camshaft for heat treatment, one or more static workpiece pre-heat process steps may be performed to adjust reduced heat intensities (without rotation) of the central section of the component, for example, central lobe 74a.

For example when one or more regions of the closely spaced eccentric cylindrical component regions require greater heating than other regions, for example the heel (base circle) region of wide central lobe 74a in tri-lobe group 72a, the heel of the central lobe can be rotated to the position shown, for example, in FIG. 13(b) and held statically in that position while current is applied to the single shot inductor to pre-heat the heel prior to rotational heating as described above. In general a selected section or sections of the at least one group of closely spaced multiple eccentric cylindrical components can be statically preheated prior to rotating the at least one group of closely spaced multiple eccentric cylindrical components by axial rotation of the group of closely spaced multiple eccentric cylindrical components relative to the single shot inductor in which the group is inserted.

As an additional pre-heat process step with static tri-lobe group 72a within single shot inductor 10 aligned as in the previous paragraph, the single shot inductor 10 may be provided with planar positioning apparatus that allows, for example, to decrease the cross sectional radial distance $r_{c2}$ in FIG. 13(b) to further increase electromagnetic coupling with the working surface of central cam lobe 74a. The planar positioning apparatus would move the single shot inductor (or the group of closely spaced multiple eccentric cylindrical components within the single shot inductor) in a plane perpendicular to the common coil sections longitudinal central axis C, for example, to decrease the spatial distance between second planar arcuate single turn coil section 10c and central lobe 74a in FIG. 13(b). After sufficient static (without rotation) pre-heat of the required cam lobe region, the single shot inductor can be moved radially outwards to its rotational heating position shown in FIG. 13(b) with cross sectional radial distance $r_{c2}$ and then rotational heating can be performed as described above.

Although the above examples address heat treatment of the cam lobes in a tri-lobe group on a camshaft the apparatus and method of the present invention can be applied with appropriate rearrangements to two or more closely spaced eccentric cylindrical components arranged along the longitudinal axis of a workpiece.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention.

The invention claimed is:

1. A single shot inductor for an induction heat treatment of a workpiece comprising at least one group of closely spaced multiple eccentric cylindrical components arranged along a longitudinal axis of the workpiece for a single shot induction heat treatment of the at least one group of closely spaced multiple eccentric cylindrical components, the single shot inductor comprising an alternating sequential series of planar arcuate coil sections and axial coil sections, the alternating sequential series of planar arcuate coil sections and axial coil sections comprising a first planar arcuate coil section, a second planar arcuate coil section and a third planar arcuate coil section axially offset from each other along the length of a common coil sections longitudinal central axis by a first and a second axial coil sections, and forming a single turn coil around the length of the common coil sections longitudinal central axis with the axial coil sections providing an axial offset distance between the planar arcuate coil sections where the alternating sequential series of planar arcuate coil sections are configured to sequentially induction heat treat selected combinations of the at least one group of closely spaced multiple eccentric cylindrical components when the at least one group of closely spaced multiple eccentric cylindrical components is inserted in the single shot inductor and axially rotated through 360 degrees.

2. The single shot inductor of claim 1 wherein the first and the second axial coil sections are oriented parallel to the common coil sections longitudinal central axis and the first, the second and the third planar arcuate coil sections are oriented in planar cross section perpendicular to the common coil sections longitudinal central axis.

3. The single shot inductor of claim 2 wherein a first inside radius of curvature of the first and the third planar arcuate coil sections is greater than a second radius of curvature of the second planar arcuate coil section with respect to the common coil sections longitudinal central axis.

4. The single shot inductor of claim 3 wherein a first heating facing surface of the first planar arcuate coil section, a second heating facing surface of the second planar arcuate coil section and a third heating facing surface of the third planar arcuate coil section are not equal.

5. The single shot inductor of claim 1 further comprising an inductor assembly comprising:
a first power terminal connected to a first alternating current source output; and
a second power terminal connected to a second alternating current source output, the first planar arcuate coil section connected to the first power terminal and the third planar arcuate coil section connected to the second power terminal to supply an alternating current power source to the single turn coil.

6. The single shot inductor of claim 5 further comprising:
a cooling fluid medium supply port disposed in the inductor assembly for a supply of a cooling fluid medium to an interior supply passage within the inductor assembly;
a cooling fluid medium return port disposed in the inductor assembly for a return of the cooling fluid medium from an interior return passage within the inductor assembly; and
an internal single shot inductor continuous cooling passage within the interior of the first planar arcuate coil section, the first axial coil section, the second planar arcuate coil section, the second axial coil section, and the third planar arcuate coil section, the interior supply passage in communication with an internal inductor entry port in the first planar arcuate coil section and the interior return passage in communication with an internal inductor exit port in the third planar arcuate coil section whereby the cooling fluid medium flows from the supply of the cooling fluid medium to the return of the cooling fluid medium.

7. The single shot inductor of claim 1 wherein the workpiece is a camshaft and the at least one group of closely spaced multiple eccentric cylindrical components comprises a tri-lobe group of cam lobes that are sequentially induction heat treat treated when the tri-lobe group of cam lobes is inserted in the single shot inductor and axially rotated through 360 degrees.

8. The single shot inductor of claim 7 wherein the tri-lobe group of cam lobes comprises a central lobe adjacent to a first end lobe and a second end lobe, the first end lobe and the second end lobe disposed on opposing sides of the central lobe.

9. The single shot inductor of claim 8 wherein each of the central lobe, the first end lobe and the second end lobe have a lobe nose diameter to lobe base circle diameter ratio within a range greater than 1.5:1 or less than 1:1.5 and the axial distance between the central lobe and each of the first end lobe and the second end lobe is no greater than 2 mm.

10. A method of a single shot induction heat treatment of a workpiece comprising at least one group of closely spaced multiple eccentric cylindrical components, the at least one group of closely spaced multiple eccentric cylindrical components comprising a first outer eccentric cylindrical component, a second outer eccentric cylindrical component and a central eccentric cylindrical component, the first outer and the second outer eccentric cylindrical components disposed on opposing axial sides of the central eccentric cylindrical component and arranged along a longitudinal axis of the workpiece with a single turn inductor for the single shot induction heat treatment, the single turn inductor comprising an alternating sequential series of planar arcuate coil sections and axial coil sections, the alternating sequential series of planar arcuate coil sections and axial coil sections comprising a first planar arcuate coil section, a second planar arcuate coil section and a third planar arcuate coil section axially offset from each other along the length of a common coil sections longitudinal central axis by a first and a second axial coil sections, and forming the single turn inductor around the length of the common coil sections longitudinal central axis with the axial coil sections providing an axial offset distance between the planar arcuate coil sections, the method comprising:

loading the workpiece with the at least one group of closely spaced multiple eccentric cylindrical components in the single turn inductor;

supplying alternating current to the single turn inductor to establish a magnetic flux around the alternating sequential series of planar arcuate coil sections and axial coil sections;

rotating the at least one group of closely spaced multiple eccentric cylindrical components in the single turn inductor so that the alternating sequential series of planar arcuate coil sections sequentially heat treats selected combinations of the at least one group of closely spaced multiple eccentric cylindrical components for each 360 rotational degrees of the at least one group of closely spaced multiple eccentric cylindrical components within the single turn inductor; and unloading the workpiece from the single turn inductor.

11. The method of claim 10 further comprising the step of positioning a central axis of the least one group of closely spaced multiple eccentric cylindrical components coincident with the common coil sections longitudinal central axis when rotating the at least one group of closely spaced multiple eccentric cylindrical components in the single turn inductor.

12. The method of claim 11 further comprising moving the single turn inductor along the length of the common coil sections longitudinal central axis when rotating the workpiece in the single turn inductor.

13. The method of claim 10 further comprising axially offsetting the first and the third planar arcuate coil sections respectively from the first outer eccentric cylindrical component and the second outer cylindrical component when rotating the at least one group of closely spaced multiple eccentric cylindrical components in the single turn inductor.

14. The method of claim 10 wherein the central eccentric cylindrical component is wider than the first outer and the second outer eccentric cylindrical component and the inside cross sectional radius of the second planar arcuate coil section is less than the inside cross sectional radius of the first and the third planar arcuate coil sections when rotating the workpiece in the single turn inductor.

15. The method of claim 10 further comprising positioning a flux concentrator around at least one of the planar arcuate coil sections when rotating the workpiece in the single turn inductor.

16. The method of claim 10 wherein the at least one group of closely spaced multiple eccentric cylindrical components comprises at least two groups of closely spaced multiple eccentric cylindrical components and each of the at least two groups of closely spaced multiple eccentric cylindrical components is sequentially positioned in the single turn inductor for the single shot induction heat treatment.

17. The method of claim 10 further comprising quenching the at least one group of closely spaced multiple eccentric cylindrical components after rotating the at least one group of closely spaced multiple eccentric cylindrical components alternatively before or after unloading the workpiece from the single turn inductor.

18. The method of claim 10 further comprising statically preheating one or more selected eccentric cylindrical components of the at least one group of closely spaced multiple eccentric cylindrical components with the single turn inductor prior to rotating the at least one group of closely spaced multiple eccentric cylindrical components.

\* \* \* \* \*